United States Patent [19]

Breya

[11] Patent Number: 5,724,363

[45] Date of Patent: Mar. 3, 1998

[54] OPTICAL ANALOG SIGNAL TRANSMISSION SYSTEM

[76] Inventor: Edward F. Breya, 1005 Windsor Dr., Menlo Park, Calif. 94025

[21] Appl. No.: 667,413

[22] Filed: Jun. 21, 1996

[51] Int. Cl.$^6$ ............................................. G06F 11/00
[52] U.S. Cl. ............................................. 371/5.5
[58] Field of Search ...................... 371/5.5, 5.4, 22.1, 371/22.36, 27.3, 27.5, 27.7; 375/239; 356/432

[56] References Cited

U.S. PATENT DOCUMENTS

| | | |
|---|---|---|
| 3,711,774 | 1/1973 | Bohler . |
| 4,070,572 | 1/1978 | Summerhayes . |
| 4,162,531 | 7/1979 | Rode et al. . |
| 4,200,933 | 4/1980 | Nickel et al. . |
| 4,249,264 | 2/1981 | Crochet et al. . |
| 4,290,146 | 9/1981 | Adolfsson et al. . |
| 4,316,141 | 2/1982 | Adolfsson et al. . |
| 4,364,027 | 12/1982 | Murooka . |
| 4,415,803 | 11/1983 | Muoi . |
| 4,553,091 | 11/1985 | Bristol . |
| 4,742,575 | 5/1988 | Arita et al. . |
| 4,799,008 | 1/1989 | Kannari . |
| 4,859,936 | 8/1989 | Eccleston . |
| 5,077,619 | 12/1991 | Toms . |
| 5,126,871 | 6/1992 | Jeffers . |
| 5,162,935 | 11/1992 | Nelson . |
| 5,267,071 | 11/1993 | Little et al. . |
| 5,453,866 | 9/1995 | Gross . |

OTHER PUBLICATIONS

U.S. application No. 08/233,583, Medelius et al. Self–Calibrating Signal–Conditioning Amplifier NASA Tech Briefs, Feb. 1997, p. 48.

Technical Support Package for Self–Calibrating Signal–Conditioning Amplifier, KSC–11750 NASA Tech Briefs.

*Primary Examiner*—Vincent P. Canney

[57] ABSTRACT

An amplitude modulated optical analog signal transmission system with an automatic calibration process is disclosed. The system provides accurate, continuous real-time signal transmission by using two or more optical transmission channels to carry the transmission signal, with the channels automatically synchronized and switched such that one channel carries the signal while the other channel is being calibrated. At least one of the channels is carrying the signal at any time, and the switching of the channels is performed such that them is no apparent perturbation of the signal caused by the calibration process. In the steady state the calibration process reduces the DC offset and gain errors of both optical transmission channels, making their individual responses accurate and substantially identical, so that the output of either channel alone or the average of their outputs, selected at the appropriate times, provide accurate representation of the transmission signal. The calibration cycle repetition rate needs only to be high enough compared to the rate of change of the system errors such as gain and offset drift caused by temperature changes and mechanical stress, to provide the desired error-correction bandwidth, which can be much lower than the system transmission bandwidth. Calibration is performed off-line for each channel, so it does not limit the bandwidth of the channel that is carrying the transmission signal at any given time.

20 Claims, 9 Drawing Sheets

OPTICAL ANALOG SIGNAL TRANSMISSION SYSTEM

BACKGROUND OF THE INVENTION

The present invention relates to a method and system for the accurate transmission of analog electrical signals by optical means. More specifically, the present invention relates to an optical signal transmission system using a plurality of parallel optical transmission channels and an automatic calibration system to provide high performance continuous, real-time analog signal transmission.

DESCRIPTION OF THE RELATED ART

Optical fiber transmission systems are used for high speed, long distance signal transmission, for galvanic isolation, and for very high immunity to electromagnetic interference. Amplitude modulation (AM) is commonly used for analog and digital signals. In an AM system, a transmitter converts an electrical input signal to an optical signal with optical power proportional to the amplitude of the electrical input signal. An optical fiber carries the optical signal to a receiver, which converts the optical signal to an electrical output signal proportional to the optical power and hence, proportional to the electrical input signal. Although the electronic portions of such systems can be designed to be very accurate, the electro-optic elements and optical portions can cause significant errors in transmission, such as DC offset error, gain error, and nonlinearity, all of which can change or drift with time, temperature and other factors. In many applications one or more of these errors can limit performance, so it is desirable to reduce them or compensate for them.

The prior art provides a number of solutions to some of these problems. For digital transmission the electrical signals can be AC coupled to eliminate DC offset errors, and an automatic gain control (AGC) means can adjust the receiver gain or comparator thresholds by measuring the received peak to peak digital signal levels, as long as a signal is being received. This type of AGC is exemplified by Muoi U.S. Pat. Nos. 4,415,803, Williams 4,540,952, and Taylor 5,012,202.

Alternatively, the transmitted signal itself may contain encoded calibration information. Summerhayes U.S. Pat. No. 4,070,572 teaches the use of an added DC reference signal to correct AC gain in an AC coupled optical fiber transmission system, and Little et al U.S. Pat. No. 5,267,071 uses an added RF pilot signal as an amplitude reference in an optical fiber RF distribution system.

System linearity can be improved electronically, as taught by Toms U.S. Pat. Nos. 5,077,619 and Nazarathy et al 5,282,072, for example, or optically as in Jeffers 5,126,871, which reduces high order distortion by transmitting differential optical signals.

Laser transmitters with stabilizing feedback are sometimes used for higher accuracy, stability, and linearity, but fiber coupling efficiency variations and detector characteristics still cause errors at the receiver. Adolfsson et al U.S. Pat. No. 4,290,146, Nelson 5,162,935, and Gross 5,453,866 teach embodiments that reduce overall DC offset error by adjusting the DC operating point of the electrical to optical transmitter by using feedback from the receiver back to the transmitter via a second optical fiber transmission channel.

Adolfsson et al U.S. Pat. No. 4,316,141 teaches the use of multiple optical fibers to transmit the signal with a reference signal encoded in a combination of the optical signals, such as their difference or ratio, which is decoded at the receiver during a calibration mode to regulate the system gain and offset. Gross 5,453,866 also shows automatic gain control with gain adjusted according to the measured response of an optical transmission channel to a calibration signal applied to the input of the transmitter. Similar calibration systems for other devices are known in the art of electronic instrument design, exemplified by Bohler 3,711,774, Rode et al 4,162,531, Nickel et al 4,200,933, Marooka 4,364,027, Bristol 4,553,091, Kannad 4,799,008 and Eccleston 4,859,936.

Some optical fiber analog signal transmission systems that have been on the market for some time (ca. 1989 or earlier), such as the EMC4-1G from Opcom Research (UK), the FOL S series from Electro Optic Developments, Ltd. (UK), and the OP-300-2 from NanoFast (Chicago, Ill.) appear to have a calibration mode wherein a built-in calibration generator that produces a signal of known amplitude is switched into the input, the resulting output signal is measured or displayed, and the transmission characteristics are adjusted to the desired accuracy. As the transmission characteristics drift it becomes necessary to calibrate the system again.

A common trait of many of the instrumentation type optical fiber signal transmission systems is that there is an operate mode in which measurements can be made, and a calibrate mode, automatically or manually invoked, wherein the system is occupied with calibration and is thus unable to make a measurement or transmit a signal. Some applications require continuous real-time signal transmission, uninterrupted by the calibration process. Although systems known in the an compensate for certain types of errors in particular applications, they do not appear to solve the problem of providing automatic reduction of errors while also providing continuous signal transmission, despite the use of a number of different techniques.

SUMMARY OF THE INVENTION

It is therefore an object of the present invention to reduce errors in an amplitude modulated optical signal transmission system by using an automatic calibration process. It is another object of the invention to provide continuous real-time signal transmission by using two or more optical transmission channels to carry the transmission signal, with the channels automatically switched and synchronized in such a way that one channel carries the signal while the other channel is being calibrated. At least one of the channels is carrying the signal at any time, and the switching of the channels is performed such that there is no apparent perturbation of the signal caused by the calibration process.

BRIEF DESCRIPTION OF THE DRAWINGS

(FIGS. 7 and 8 are on one sheet).

DETAILED DESCRIPTION OF THE INVENTION

Figure 1:
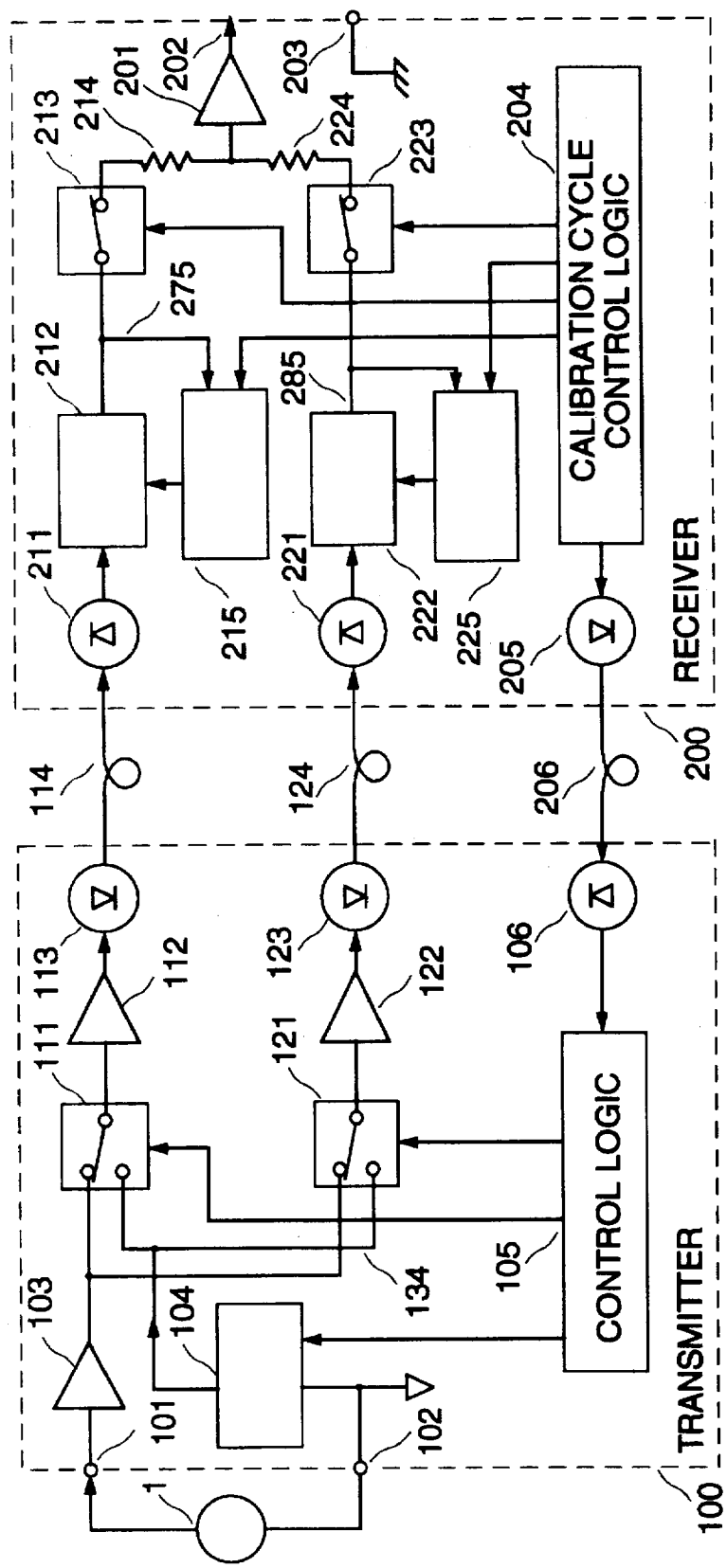
FIG. 1 is the overall block diagram of a preferred embodiment of the optical analog signal transmission system using optical fibers.

In the preferred embodiment of FIG. 1 an input signal 1 with respect to the transmitter input common terminal 102, is applied to input terminal 101 of transmitter 100 and amplified by input amplifier 103 to provide a transmission signal which is passed by first and second input switching means 111 and 121 to two parallel, substantially identical first and second optical transmission channels, respectively, each comprising means to convert an electrical drive signal applied to a drive input into optical radiation, means to convey the optical radiation to a receiver, means to convert the received optical radiation into an electrical detector signal, and means to amplify the detector signal to produce a received output signal representative of the electrical drive signal.

The first optical transmission channel comprises driver 112, light emitting diode (LED) 113, optical fiber 114, optical detector 211 and amplifier system 212. The second optical transmission channel comprises driver 122, light emitting diode 123, optical fiber 124, optical detector 221 and amplifier system 222.

The first and second input switching means 111 and 121 are separately controlled by control logic 105, and can connect the drive inputs of the first and second optical transmission channels to the transmission signal, or to a calibration signal 134 from calibration generator 104, so that each of the electrical drive signals can be proportional to either the transmission signal or the calibration signal.

The received output signals 275 and 285 from amplifier systems 212 and 222 respectively are demultiplexed by an output switching circuit comprising switches 213 and 223, resistors 214 and 224, and output buffer amplifier 201, arranged so that there is an output signal 202 that can be proportional to the received output signal of either one of the optical transmission channels, or proportional to the average of the received output signals of the optical transmission channels. Output buffer amplifier 201 produces the output signal 202 with respect to receiver common 203. The output signal 202 is representative of the input signal 1 but may have different scaling or polarity, for example, depending on the overall system requirements, and a time delay due to the optical fiber and amplifier delays. The common-mode voltage between the transmitter input signal and the receiver output signal is unlimited because the transmitter and receiver are galvanically isolated by the optical fibers, which are electrically non-conductive.

Offset and gain errors in the optical transmission channels are compensated by the first and second error correction circuits. The first error correction circuit comprises means to measure the response of the first optical transmission channel to the calibration signal, in order to adjust its characteristics to reduce its transmission errors, and means to adjust its transmission characteristics. The second error correction circuit comprises means to measure the response of the second optical transmission channel to the calibration signal, in order to adjust its characteristics to reduce its transmission errors, and means to adjust its transmission characteristics. Error correction circuits 215 and 225 measure the overall characteristics of the first and second optical transmission channels by sampling the received output signals from amplifier systems 212 and 222 respectively, and adjust their DC offset and gain using means known in the art.

A control system comprising calibration cycle control logic 204, LED 205, optical fiber 206, optical detector 106 and control logic 105 controls the timing and operation of the calibration generator, the first and second input switching means, the first and second error correction circuits, and the output switching circuit. The calibration cycle control logic 204 initiates system calibration cycles by sending serial digital control signals at regular intervals via LED 205 and optical fiber 206 to the transmitter 100. Optical detector 106 converts the optical signal from LED 205 into an electrical signal which is applied to control logic 105, which decodes the serial digital control signals and controls the first and second input switching means, the calibration generator, and other functions of the transmitter. Because the calibration cycle is predetermined, and the receiver initiates it, the logical activities of the transmitter and receiver are inherently synchronized.

The control system provides a plurality of states comprising: a state wherein the drive input of the first optical transmission channel is proportional to the transmission signal, the drive input of the second optical transmission channel is proportional to the calibration signal, the second error correction circuit is measuring the response of the second optical transmission channel to the calibration signal, in order to adjust the characteristics of the second optical transmission channel to reduce its transmission errors, and the output signal is proportional to the received output signal of the first optical transmission channel; a state wherein the drive input of the second optical transmission channel is proportional to the transmission signal, the drive input of the first optical transmission channel is proportional to the calibration signal, the first error correction circuit is measuring the response of the first optical transmission channel to the calibration signal, in order to adjust the characteristics of the first optical transmission channel to reduce its transmission errors, and the output signal is proportional to the received output signal of the second optical transmission channel; and optionally a state wherein the drive input of each of the optical transmission channels is proportional to the transmission signal, and the output signal is proportional to the average of the received output signals of the optical transmission channels.

When a calibration cycle starts, the receiver calibration cycle control logic 204 first opens switch 213, disconnecting the received output of the first optical transmission channel so that output buffer amplifier 201 is driven only by the signal from resistor 224, and the output signal is proportional to the received output of the second optical transmission channel. Control logic 105 then changes the state of input switching means 111, disconnecting the input of driver 112 from the transmission signal from input amplifier 103, and connecting it to the calibration generator 104, which produces a number of discrete levels in a prescribed sequence. Each calibration level is transmitted through the first optical transmission channel (CHANNEL-A). During calibration of CHANNEL-A the first error correction circuit measures the response of CHANNEL-A to the calibration signal in order to adjust its transmission characteristics to reduce its transmission errors. The drive input of the second optical transmission channel (CHANNEL-B) is still connected to the transmission signal from amplifier 103, and the CHANNEL-B received output signal is still connected through switch 223 and resistor 224 to the output buffer 201. After the calibration of CHANNEL-A is completed, the control logic 105 in the transmitter disconnects driver 112 from the calibration generator 104 and connects it back to the transmission signal from input amplifier 103 via input switching means 111. A short time later the calibration cycle control logic 204 turns on switch 213 to again connect CHANNEL-A to the output buffer. Depending on the system requirements, output buffer amplifier 201 may, for a period of time, be driven by both CHANNEL-A and CHANNEL-B via switches 213 and 223 and resistors 214 and 224, so the output signal 202 is proportional to the average of the received output signals from CHANNEL-A and CHANNEL-B.

The receiver calibration cycle control logic 204 then opens switch 223, disconnecting the received output of the second optical transmission channel so that output buffer amplifier 201 is driven only by the signal from resistor 214, and the output signal is proportional to the received output of the first optical transmission channel. Control logic 105 then changes the state of input switching means 121, disconnecting driver 122 from the transmission signal from input amplifier 103, and connecting it to the calibration generator 104. Each calibration level is then transmitted through CHANNEL-B, while CHANNEL-A carries the transmission signal. After the calibration of CHANNEL-B is completed, the control logic 105 in the transmitter disconnects the driver 122 from the calibration generator 104 and connects it back to the input amplifier 103 via input switching means 121. A short time later the receiver calibration cycle control logic 204 turns on switch 223 to again connect CHANNEL-B to the output buffer, so the output signal may again be proportional to the average of the received output signals from CHANNEL-A and CHANNEL-B.

The control system repetitively controls the plurality of states in a prescribed sequence, which is repeated indefinitely, allowing one optical transmission channel to carry the transmission signal while the other is being calibrated. In the steady state the calibration process reduces the DC offset and gain errors of both optical transmission channels, making their individual responses accurate and substantially identical, so that the received output of either channel alone or the average of their received outputs, selected at the appropriate times, provides accurate, continuous representation of the transmission signal. The outputs and inputs of the channels are switched in such a way that there is no apparent interruption of the transmission signal through the overall system. During the calibration cycle the received output of each channel is disconnected before its drive input is transferred from the transmission signal to the calibration signal, and its drive input is reconnected to the transmission signal before its received output is reconnected to the buffer amplifier, with enough time allowed for digital control time delays, switching time delays and device settling, so that switching transients do not appear in the output signal. The period of overlap when both channels are connected to the buffer amplifier may be reduced to zero in theory, but it would require essentially perfect switches in the output switching circuit with zero time delay in their control. The overlap period with averaging of the received output signals allows practical switching devices to make smooth transitions between the channels with minimal effect on the output signal.

It does not matter in what order the optical transmission channels are calibrated nor does it matter in what order the various calibration levels are transmitted, as long as the receiver and transmitter circuits process the information properly. It is also possible to transmit the different calibration levels in separate calibration cycles rather than to transmit the entire plurality of calibration levels in one calibration cycle. It is also possible to instead put the calibration cycle control means inside the transmitter, and have it send digital control signals to the receiver circuits via an optical fiber transmission channel, to accomplish the same function.

Because the transmitter is typically powered by batteries or by optical power conversion means, it is desirable to minimize the power drawn by the transmitter circuits. The LED drivers (parts 112 and 122 of FIG. 1) use a large portion of the total circuit power to drive their corresponding LEDs, and they may exhibit large current swings while following the transmission signal. It is possible to drive the LEDs out of phase in a "pseudo-differential" mode so that during the times when both channels are carrying the transmission signal, as it moves one way, one of the drivers increases current drive to its LED, and the other decreases its current. This tends to make the total current approximately constant as in a differential amplifier stage, and thus less demanding to the power source. This can be done in an embodiment not shown, wherein the CHANNEL-A LED driver in the transmitter has an additional inverting amplifier stage, and in the receiver, CHANNEL-B has an additional inverting amplifier stage, so the LED currents and their resulting optical signals will be out of phase, but the received output signals of the two channels will still be in-phase. The calibration cycles will be substantially the same as described for FIG. 1, but the relative polarities of the other system elements need to be appropriate for the arrangement. The number and types of amplifier stages in each channel should be the same so that the channels exhibit the same high-speed characteristics and time delays. During calibration of either channel, the LED driver currents will not cancel out, however, so the power source must accommodate this varying load current.

The calibration cycle repetition rate needs only to be high enough compared to the rate of change of the system errors such as gain and offset drift caused by temperature changes and mechanical stress, to provide the desired error-correction bandwidth, which can be much lower than the system transmission bandwidth. Calibration is performed off-line for each channel, so it does not limit the bandwidth of the channel that is carrying the transmission signal at any given time. For example, the calibration cycle rate may be several hundred hertz, while the transmission bandwidth may be several hundred megahertz.

Figure 2:
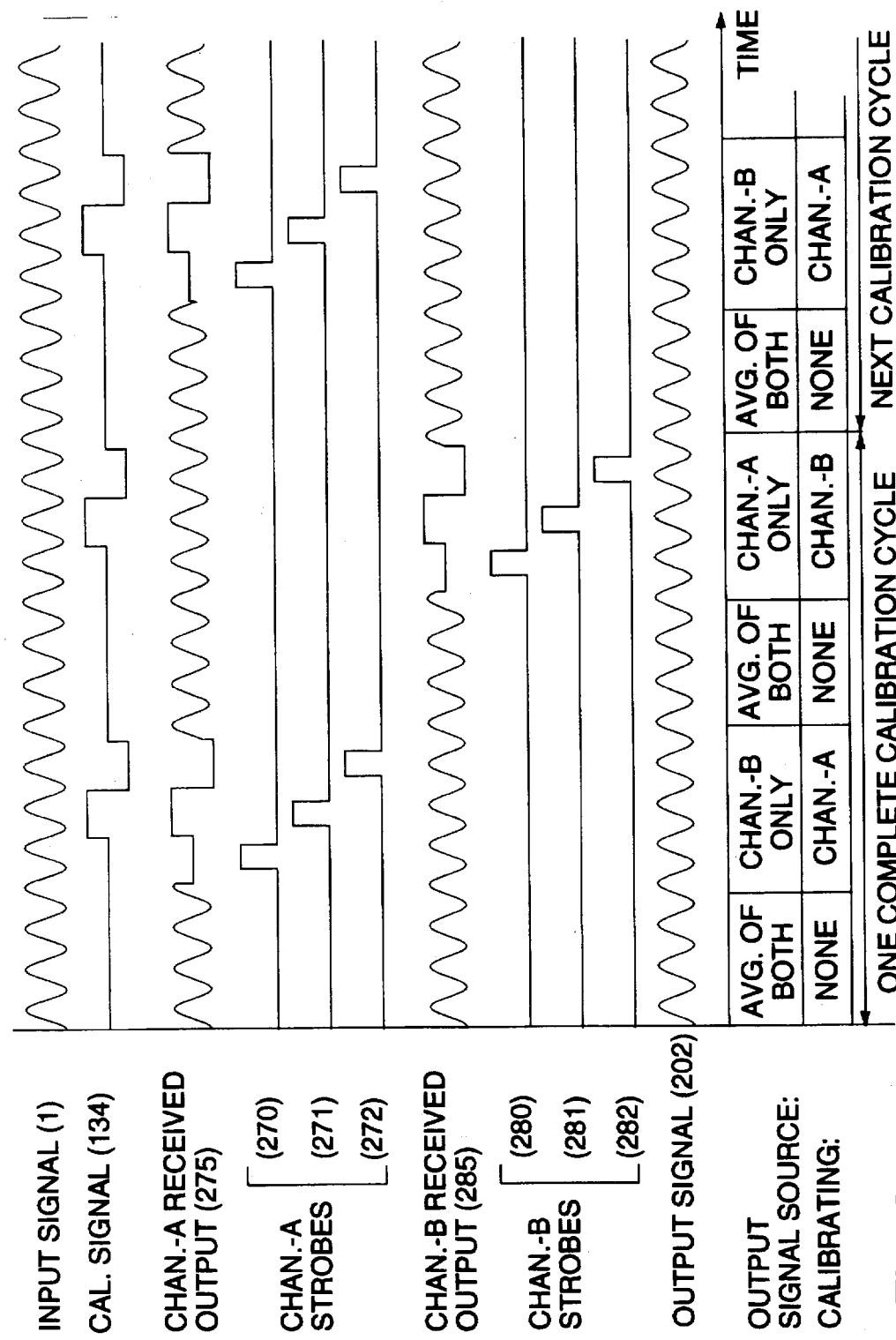
FIG. 2 shows some of the waveforms and activities of the calibration cycle for offset and gain correction associated with the description of FIG. 1.

FIG. 2 shows the salient waveforms associated with the calibration process. The input signal can be anything but is shown as a simple sine wave for this example. There is no need for any time correlation between the input signal and the calibration process activity. The calibration signal levels comprise zero, plus (+) full span and minus (−) full span, or they could be any appropriate levels, depending on the overall requirements of the system. The signals transmitted through the optical transmission channels comprise the transmission signal multiplexer with the calibration signal, with CHANNEL-A and CHANNEL-B alternating so that at least one of the channels is carrying the transmission signal at any time. In the receiver the received output of each channel is sampled at times corresponding to the levels of the calibration signal, as shown by the sample strobe signals 270, 271, 272, 280, 281 and 282. The sampled values are used to adjust the DC offset and gain of each channel. The channels are demultiplexed to provide an output signal that is representative (except for scaling, polarity and time delay) of the transmission signal, and thus also representative of the input signal, with no apparent perturbation from the calibration process.

Figure 3:
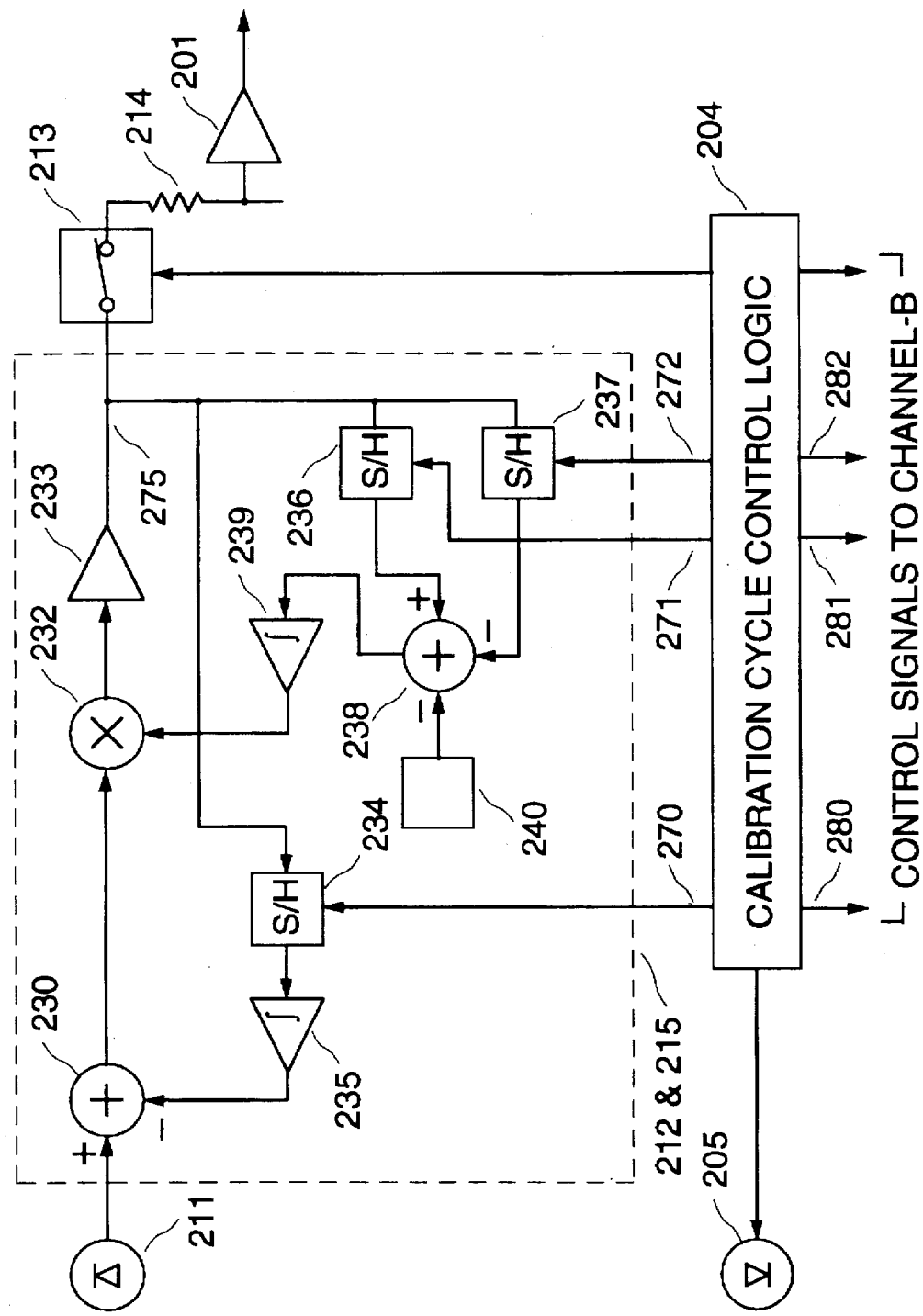
FIG. 3 shows more detail of the offset and gain correction block for CHANNEL-A.

During this sequence the calibration cycle control logic 204 in the receiver produces strobe signals for the error correction circuits 215 and 225, which comprise means to measure and adjust the transmission characteristics of the first and second optical transmission channels. FIG. 3 shows these in more detail, for CHANNEL-A. During the time that the calibration generator signal is at zero a strobe signal actuates the sample and hold circuit 234 which samples and stores the offset error at the output of amplifier 233 and applies it to integrator 235, which integrates the error to reduce the CHANNEL-A DC offset by adding a correction signal to the detector signal at summing circuit 230. Likewise sample and hold circuits 236 and 237 sample and store the plus full span and minus full span values, respectively. Summing circuit 238 takes their difference, which represents the peak-to-peak full span response of the channel, and compares it to reference voltage 240. The resulting error is integrated by integrator 239 which adjusts gain control circuit 232 to correct the CHANNEL-A gain by making the peak-to-peak full span equal to the reference voltage. Referring back to FIG. 1, after this calibration sequence is completed, the control logic 105 in the transmitter disconnects the driver 112 from the calibration generator 104 and connects it back to the input amplifier 103 via input switching means 111. The CHANNEL-B error correction circuit is substantially the same as that for CHANNEL-A, with the timing of its activities in accordance with the foregoing description of FIG. 1.

Figure 4:
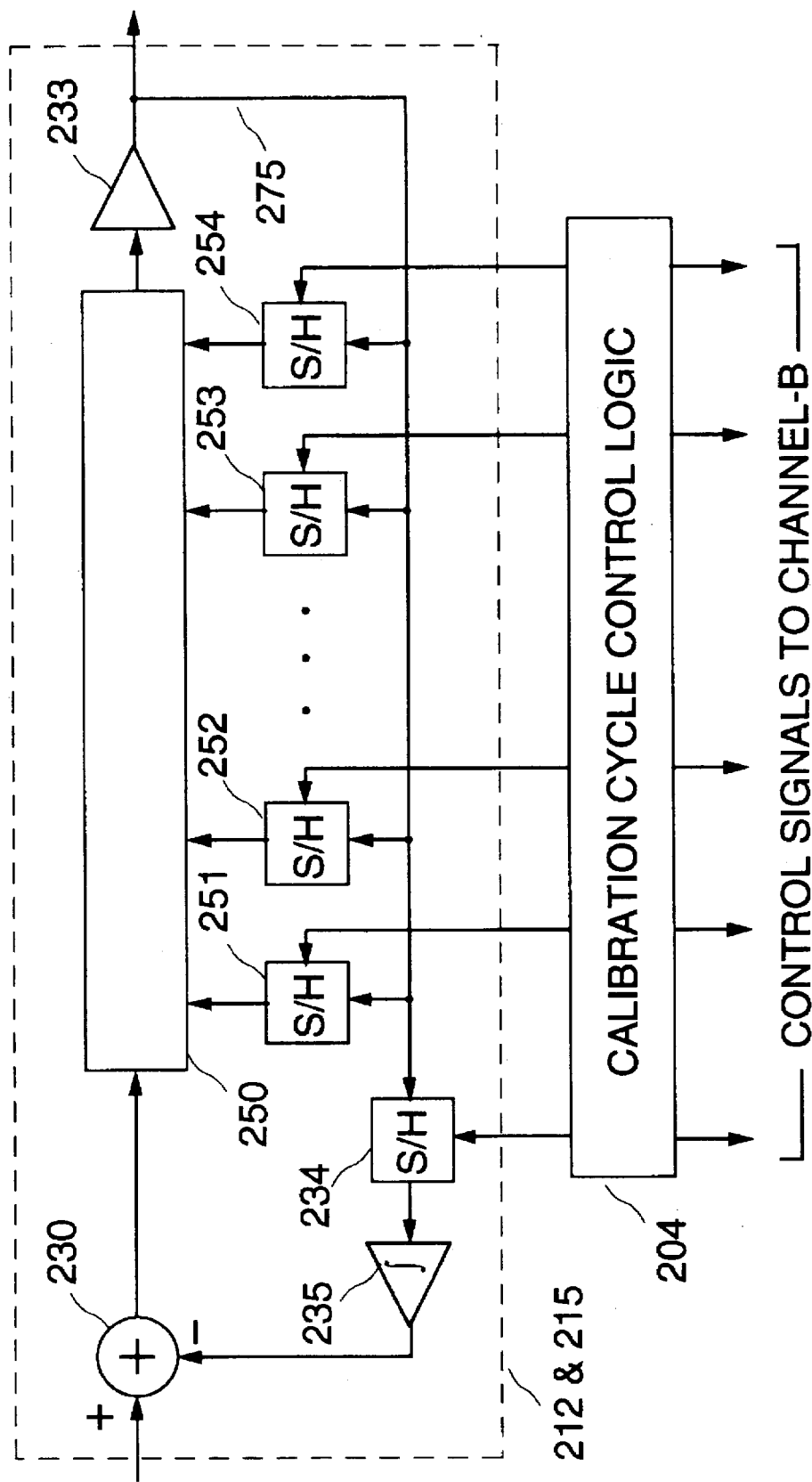
FIG. 4 shows details of a linearity correction block for CHANNEL-A.
Figure 5:
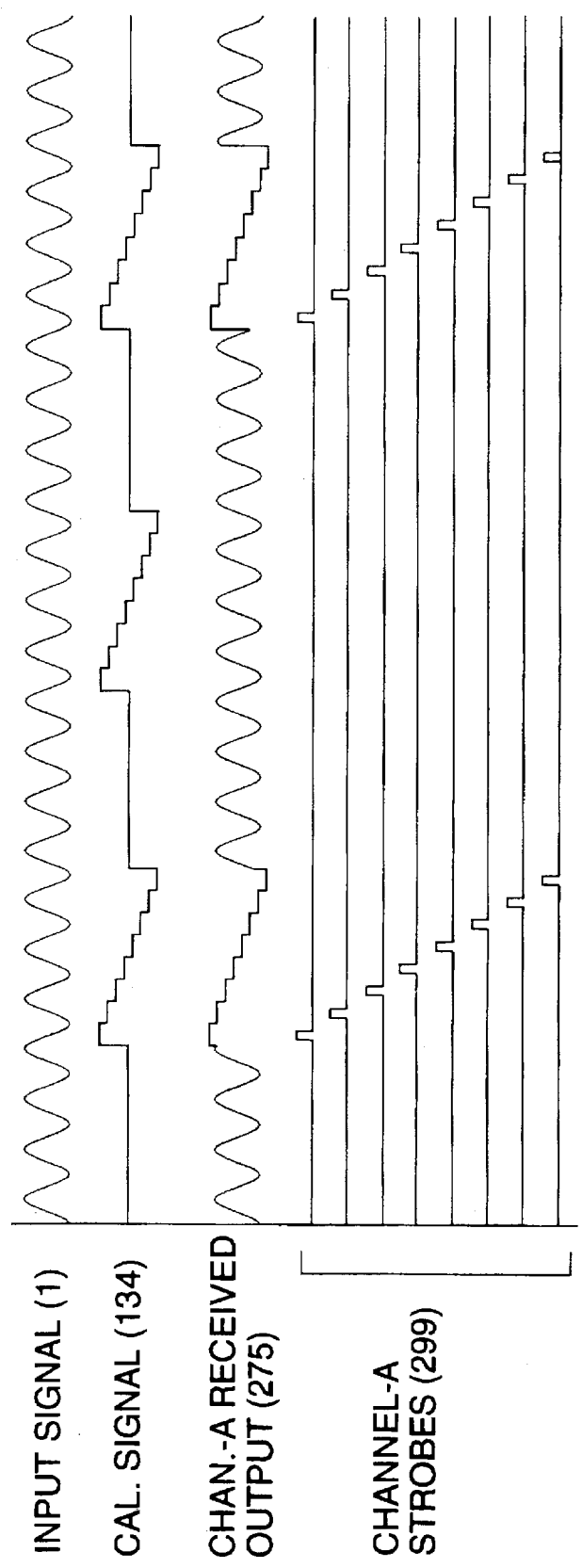
FIG. 5 shows some of the waveforms associated with the calibration cycle for linearity correction associated with the description of FIG. 4.

This calibration system can be adapted to correct nonlinearity in the optical transmission channels. FIG. 4 shows the CHANNEL-A linearity correction system. The CHANNEL-B system is substantially the same as that for CHANNEL-A, except for its timing. In this embodiment the calibration generator (part 104 of FIG. 1) produces a plurality of discrete levels or even a continuous waveform during the calibration period. These levels are sampled at the receiver by a plurality of sample and hold amplifiers such as 251 through 254, and compared to the corresponding levels that would be transmitted by a perfectly linear optical transmission channel, and the resulting error information is used to adjust the gain and linearize the transfer function by the adjustable gain and distortion circuit 250, which may be implemented with techniques known in the art. FIG. 5 shows some of the waveforms associated with the embodiment of FIG. 4, using an example with eight levels strobed at appropriate times by eight strobe signals 299.

Figure 6:
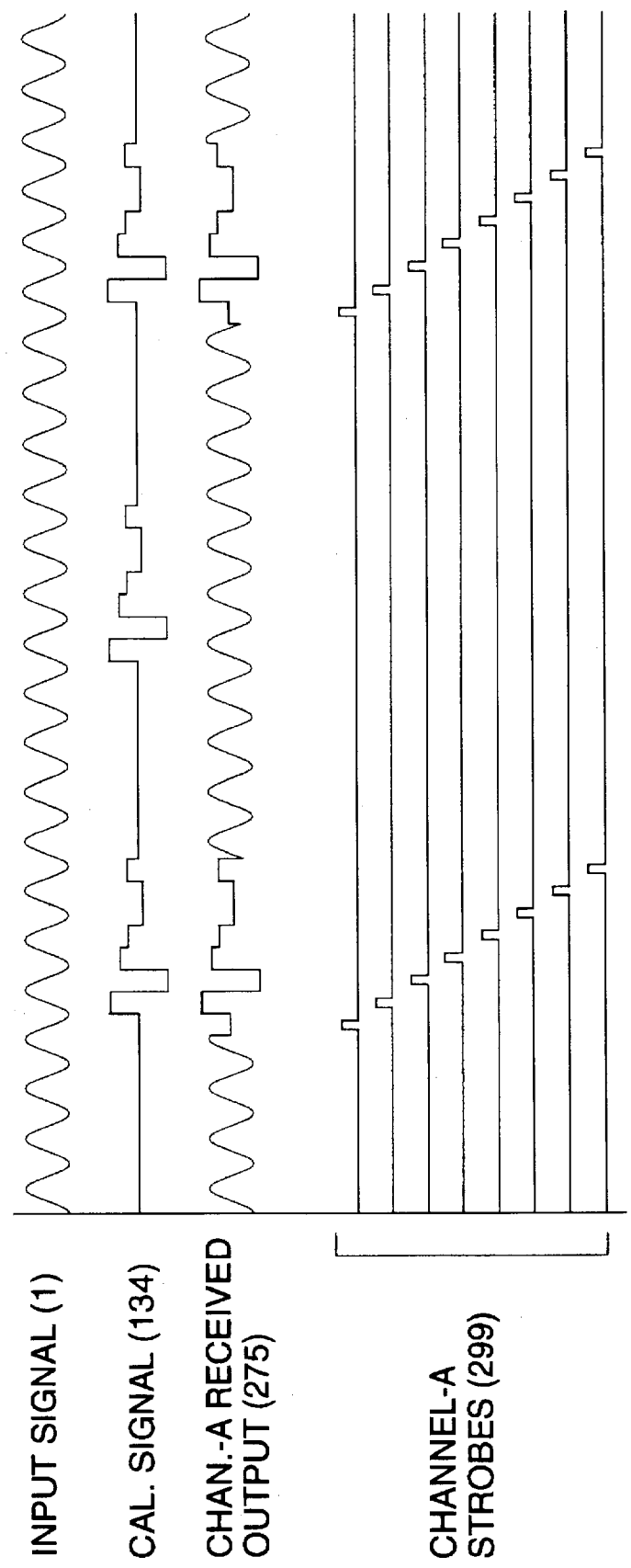
FIG. 6 shows some of the waveforms associated with auxiliary data transmission on CHANNEL-A.

In the preferred embodiment of FIG. 1 the calibration control logic 204 sends serial digital control data to the control logic 105 primarily to synchronize the calibration cycle activities of the receiver and transmitter. Additional data can be sent and decoded to control other functions of the transmitter such as input ranging and signal coupling (not shown). It is also useful to send data from the transmitter to the receiver, for example, to confirm function settings, indicate battery levels, or diagnose problems in the transmitter. This data can be sent from the transmitter to the receiver during the calibration periods, thereby avoiding the need for an additional optical transmission channel for this purpose. To do this the calibration generator sequentially generates the calibration signal, and a plurality of additional levels to convey additional information. The additional levels vary depending on the data to be sent to the receiver, and can represent analog or digital data because each optical transmission channel is calibrated. During each calibration cycle, additional strobes in the receiver corresponding to the data time slots are used to sample and store the data on each of the channels. This is a type of time division multiplexing (TDM), so the time allowed for each calibration level and data level becomes shorter as more are used, for a given calibration duty factor and repetition rate. Conversely, the time per level could be lengthened by reducing the repetition rate, but the error-correction bandwidth would be reduced. FIG. 6 shows an example wherein the CHANNEL-A received output signal includes three calibration reference levels followed by auxiliary data consisting of one analog level and four binary data bits, for a total of eight time slots. CHANNEL-A and CHANNEL-B can transmit different auxiliary data if necessary, by appropriately controlling the calibration generator.

Figure 7:
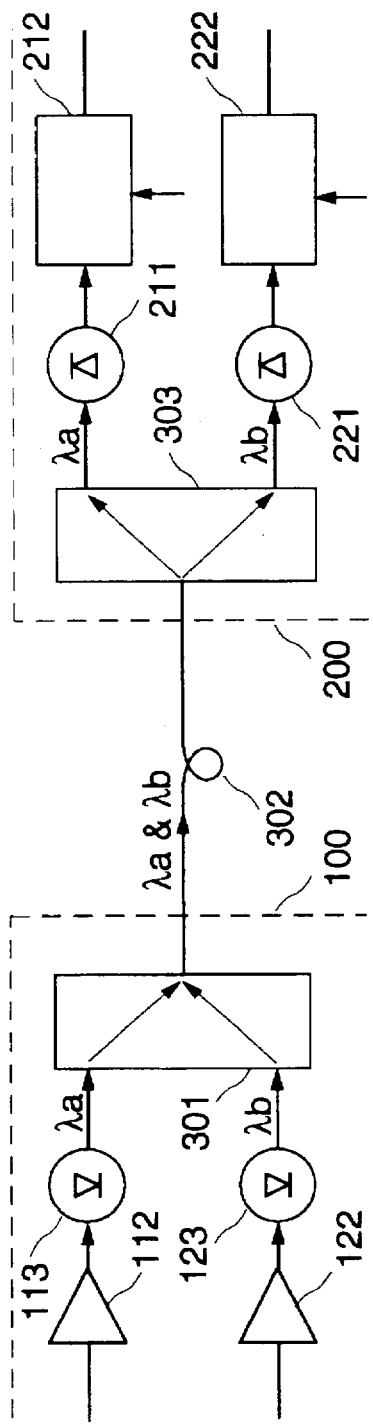
FIG. 7 shows the use of wavelength division multiplexing (WDM) to provide transmission of CHANNEL-A and CHANNEL-B on a single optical fiber.
Figure 8:
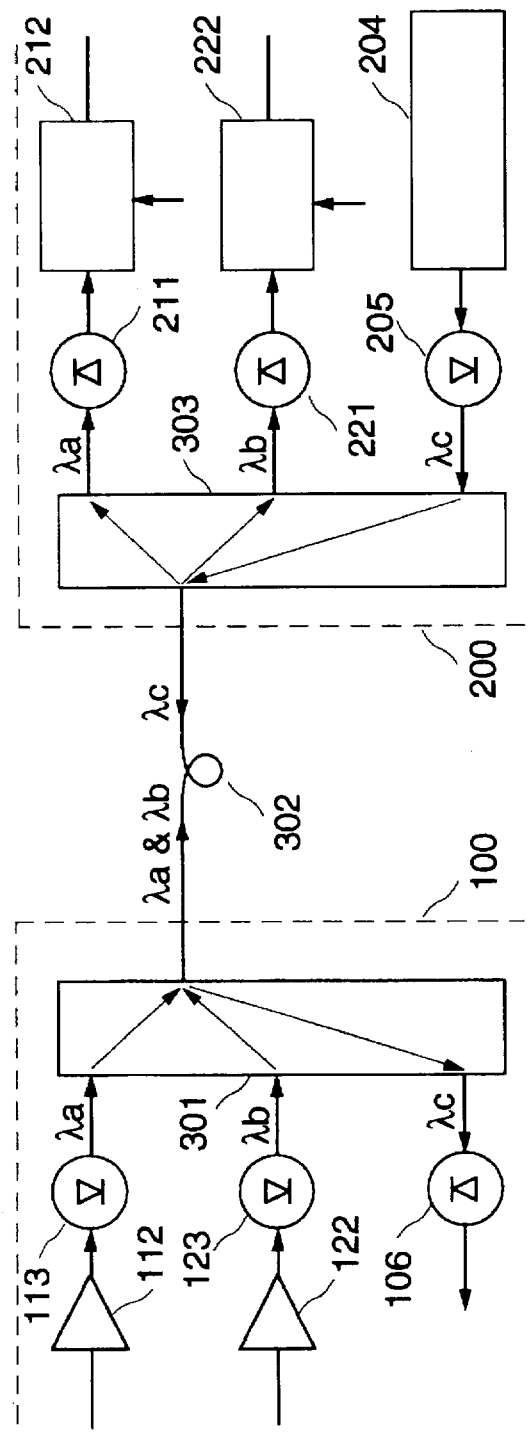
FIG. 8 shows how to also include the control channel using WDM.

Each of the optical transmission channels does not necessarily have to use a separate optical fiber. Wavelength division multiplexing (WDM) is known in the art and can be used to provide a plurality of channels on a single optical fiber. In FIG. 7 light emitting diodes 113 and 123 emit light at different wavelengths $\lambda a$ and $\lambda b$, respectively. The light from the LEDs is combined in optical coupler means 301 and transmitted through optical fiber 302, to optical splitter means 303, which splits the optical signal to optical detectors 211 and 221, which are substantially responsive only to $\lambda a$ and $\lambda b$, respectively. The wavelength discrimination means of the optical detectors can be provided by known art and may be intrinsic to the detectors or to the optical elements 301 and 302, or provided by additional optical elements not shown. FIG. 8 further shows the elimination of the separate control optical fiber (part 206 in FIG. 1) by using a third wavelength $\lambda c$ to also carry the serial digital control signal from the receiver to the transmitter through optical fiber 302. LED 205 emits light at wavelength $\lambda c$ which is coupled into optical fiber 302 by optical coupler means 303 and separated by optical coupler means 301 to optical detector 106 which is substantially responsive only to $\lambda c$. It is also possible to use other means to convey the optical radiation from the LEDs to the optical detectors, such as transmission through space, using wavelength division multiplexing or physical barriers to prevent crosstalk between the optical transmission channels.

In the preferred embodiment it is necessary that the output switching circuits are capable of making smooth state transitions and that the switching occurs at the correct times so that there is minimal perturbation of the output signal. In some applications it may be possible to use the characteristics of the external measuring instrumentation that ultimately receives the output signal, to simplify the switching requirements. For example, in equipment that digitizes signals there may be specific dead times between digital samples or sequences of samples, where switching perturbations would have no effect. It may then be possible to synchronize the digitizing activity of the measuring instrument with the automatic calibration activity of the optical transmission system. This can be accomplished by having the measuring instrumentation send control signals to the optical transmission system or vice versa.

Figure 9:
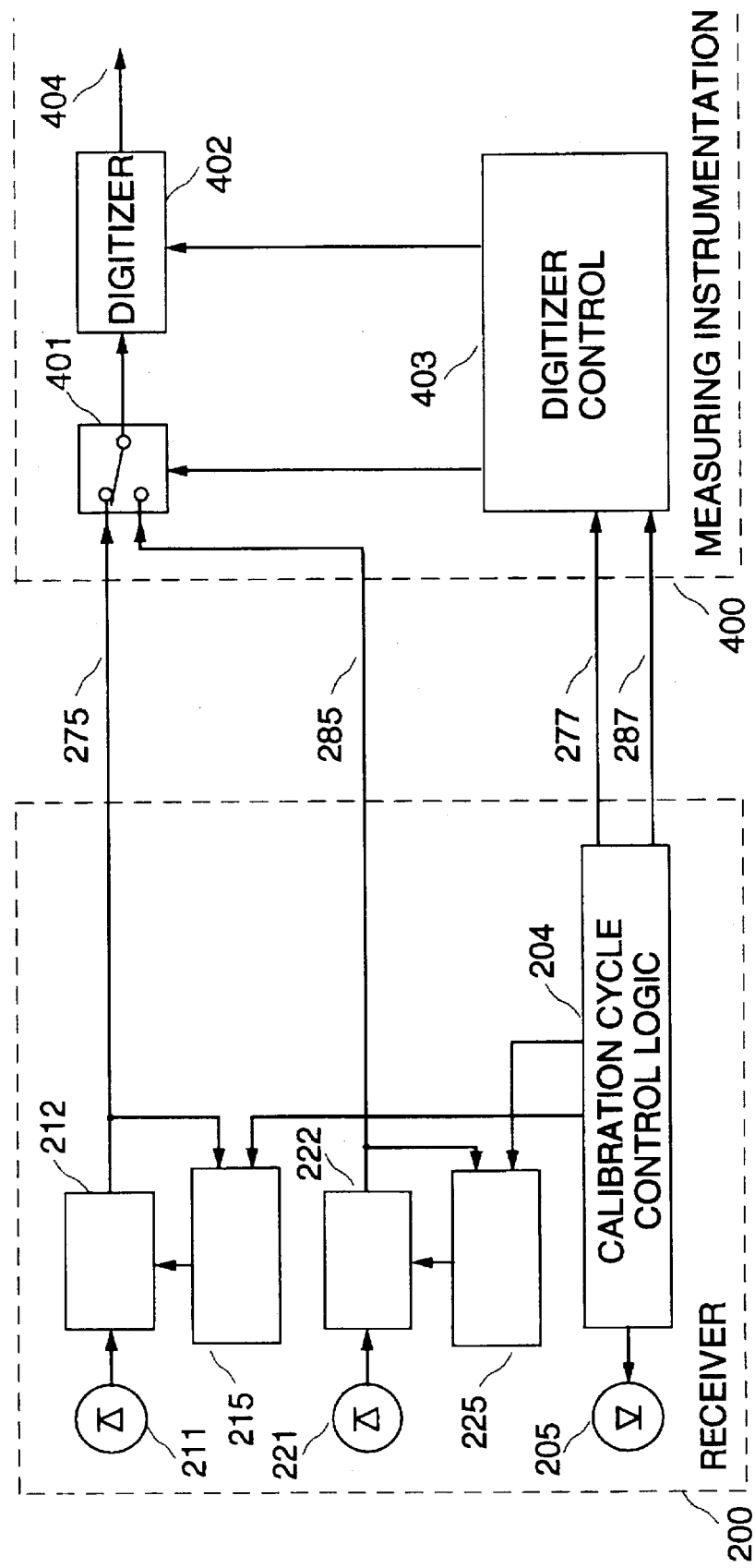
FIG. 9 shows an embodiment wherein the channel switching is performed in the measuring instrumentation.
Figure 10:
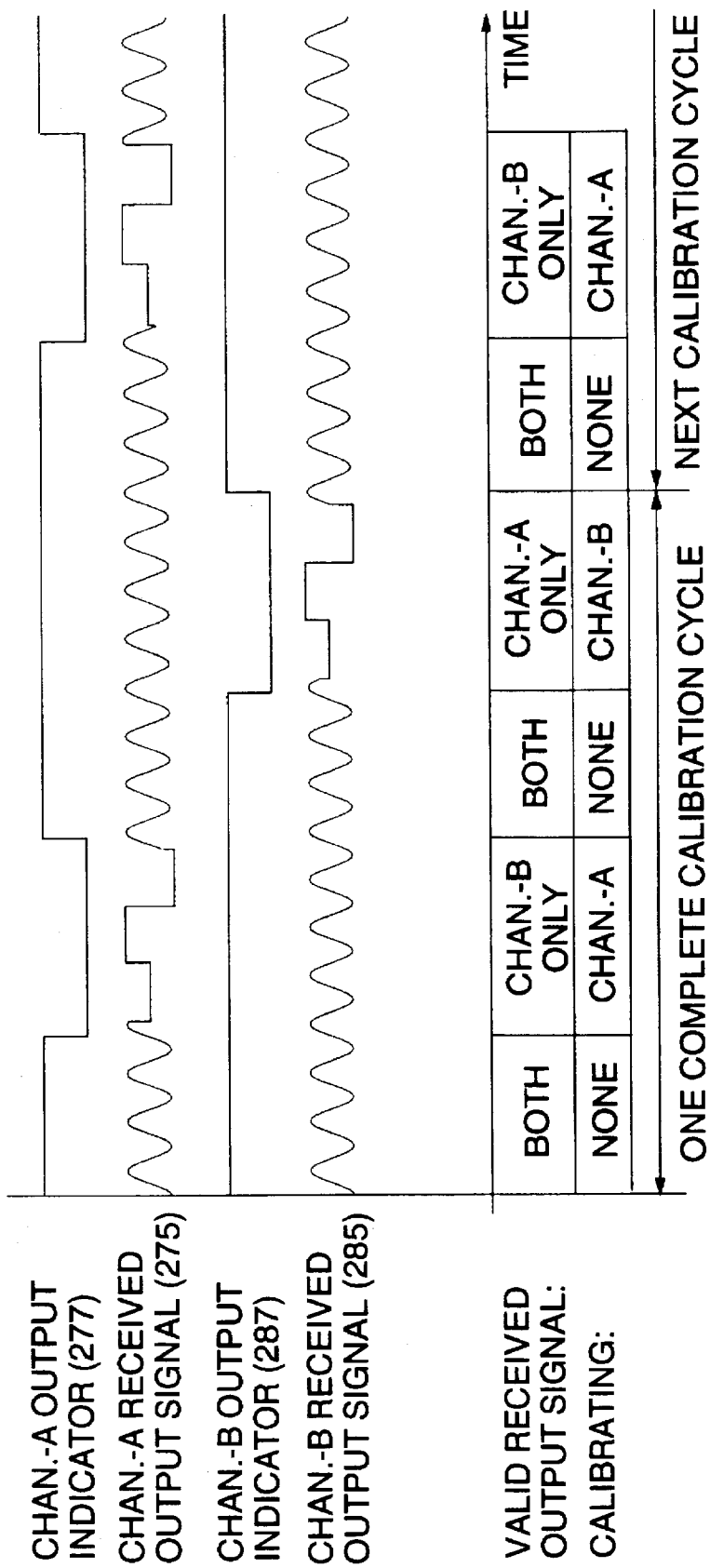
FIG. 10 shows some of the waveforms associated with the description of FIG. 9.

In the embodiment of FIG. 9 for example, the received output signals 275 and 285 of the first and second optical transmission channels are brought out separately from the receiver 200 and connected to a switching means 401 inside measuring instrumentation 400. The receiver calibration cycle control logic 204 provides output indicator means which are logically indicative of the operational condition of the first and second optical transmission channels. For example, two digital output indicator signals 277 and 287 are connected to the measuring instrumentation digitizer control 403, which appropriately controls the switching means 401 and digitizer 402, which outputs the digital equivalent 404 of the transmission signal. Switching means 401 would not need to transition smoothly nor would there need to be a period of time when the output signal is proportional to the average of the channel outputs. If the switching and signal settling occur before the next sample period of the digitizer the switch output only needs to be connected to one channel or the other. Alternatively, the CHANNEL-A and CHANNEL-B signals could each be digitized by a separate digitizer and the resulting digital data selected according to the digital output indicator signals, providing the equivalent switching function. FIG. 10 shows the salient external signals associated with these external switching arrangements, wherein the digital output indicator signals indicate whether or not the received output signals of the first and second optical transmission channels are validly representative of the transmission signal. These signals are used by the digitizer control means inside the measuring instrumentation to select the valid signal at the appropriate times.

Conversely, the control system could include means to suspend and resume repetition of the prescribed sequence of the plurality of states in response to a halt control signal from the measuring instrumentation, in order to allow the calibration cycles to occur only during times when there would be no adverse effect upon the digitizing of the output signal.

It should be understood that the light emitting diodes, optical fibers and optical detectors and related apparatus used for the foregoing description of the various embodiments may be replaced by other known apparatus that emit, convey or detect optical radiation. It should also be understood that the embodiments described herein can be extended to a system where more than two optical transmission channels are used to carry the transmission signal, with each channel carrying the signal for a time and being calibrated for a time, and switched at appropriate times. It should also be understood that the means for calibration cycle control and measurement and adjustment of the optical transmission channel characteristics can be provided in many ways, and located in the transmitter or the receiver or distributed between them in many ways. However, it is generally preferable to minimize the size, complexity and power dissipation of the transmitter by placing as much of the operative circuitry as possible in the receiver.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of providing automatic error reduction in an optical signal transmission system comprising two parallel, substantially identical first and second optical transmission channels, each with means to convert an electrical drive signal applied to a drive input into optical radiation, means to convey the optical radiation to a receiver, a detector to convert the received optical radiation into an electrical detector signal, and an amplifier system to amplify the detector signal to produce a received output signal representative of said electrical drive signal; a calibration generator to generate a calibration signal; first and second input switching means arranged so that said drive input of each of said optical transmission channels can be proportional to either a transmission signal or said calibration signal; first error correction circuit comprising means to measure the response of said first optical transmission channel to said calibration signal, in order to adjust its characteristics to reduce its transmission errors, and means to adjust its transmission characteristics; and second error correction circuit comprising means to measure the response of said second optical transmission channel to said calibration signal, in order to adjust its characteristics to reduce its transmission errors, and means to adjust its transmission characteristics; an output switching circuit arranged so that there is an output signal that can be proportional to any one of a plurality of signals comprising the received output of said first optical transmission channel, the received output of said second optical transmission channel, and the average of the said received outputs of said first and second optical transmission channels; and a control system which controls the operation of said calibration generator, said first and second input switching means, said first and second error correction circuits, and said output switching circuit; the object being to make said output signal an accurate, continuous representation of said transmission signal; said method comprising the steps of:

a) disconnecting said received output of said first optical transmission channel so that said output signal is proportional to said received output of said second optical transmission channel;

b) disconnecting said drive input of said first optical transmission channel from said transmission signal, and connecting it to said calibration signal;

c) measuring the response of said first optical transmission channel to said calibration signal, and adjusting the transmission characteristics of said first optical transmission channel in order to reduce its transmission errors;

d) disconnecting said drive input of said first optical transmission channel from said calibration signal, and reconnecting it to said transmission signal;

e) reconnecting said received output of said first optical transmission channel so that said output signal is proportional to the average of said received outputs of said first and second optical transmission channels;

f) disconnecting said received output of said second optical transmission channel so that said output signal is proportional to said received output of the said first optical transmission channel;

g) disconnecting said drive input of said second optical transmission channel from said transmission signal, and connecting it to said calibration signal;

h) measuring the response of said second optical transmission channel to said calibration signal, and adjusting the transmission characteristics of said second optical transmission channel in order to reduce its transmission errors;

i) disconnecting said drive input of said second optical transmission channel from said calibration signal, and reconnecting it to said transmission signal; and j) reconnecting said received output of said second optical transmission channel so that said output signal is proportional to the average of said received outputs of said first and second optical transmission channels.

2. The method defined in claim 1, wherein the steps (a) through (j) are repeated indefinitely.

3. The method defined in claim 1, wherein there is a plurality of substantially identical optical transmission channels, comprising said first and second optical transmission channels, and one or more additional optical transmission channels, with input switching means arranged to connect the electrical drive inputs of each of the optical transmission channels either to said transmission signal or to said calibration signal, means to measure and adjust the transmission characteristics of each of said optical transmission channels, and output switching means arranged so that there is an output signal that can be proportional to the average of the received outputs of two or more of said plurality of optical transmission channels, or proportional to the received output of only one of said optical transmission channels, said method further comprising, for each of said additional optical transmission channels, the additional steps comprising:

i) disconnecting the received output of said additional optical transmission channel so that said output signal is proportional to the average of said received outputs of two or more of said plurality of optical transmission channels except for said additional optical transmission channel;

ii) disconnecting said drive input of the said additional optical transmission channel from said transmission signal, and connecting it to said calibration signal;

iii) measuring the response of said additional optical transmission channel to the said calibration signal, and adjusting the transmission characteristics of said additional optical transmission channel to reduce its transmission errors;

iv) disconnecting said drive input of said additional optical transmission channel from said calibration signal, and reconnecting it to said transmission signal; and v) reconnecting said received output of said additional optical transmission channel so that said output signal is proportional to the average of said received outputs two or more of said plurality of optical transmission channels.

4. The method defined in claim 3, wherein the steps (a) through (j) of claim 1 and the additional steps (i) through (v) for each of said additional optical transmission channels of claim 3 are repeated indefinitely.

5. An optical transmission system for optical transmission of an electrical signal, comprising:

a) two parallel, substantially identical first and second optical transmission channels, each with means to convert an electrical drive signal applied to a drive input into optical radiation, means to convey the optical radiation to a receiver, a detector to convert the received optical radiation into an electrical detector signal, and an amplifier system to amplify the detector signal to produce a received output signal representative of said electrical drive signal;

b) a calibration generator to generate a calibration signal;

c) first and second input switching means arranged so that said drive input of each of said optical transmission channels can be proportional to either a transmission signal or said calibration signal;

d) first error correction circuit comprising means to measure the response of said first optical transmission channel to said calibration signal, in order to adjust its characteristics to reduce its transmission errors, and means to adjust its transmission characteristics; and second error correction circuit comprising means to measure the response of said second optical transmission channel to said calibration signal, in order to adjust its characteristics to reduce its transmission errors, and means to adjust its transmission characteristics;

e) an output switching circuit arranged so that there is an output signal that can be proportional to any one of a plurality of signals comprising the received output of said first optical transmission channel, and the received output of said second optical transmission channel; and f) a control system which controls the operation of said calibration generator, said first and second input switching means, said first and second error correction circuits, and said output switching circuit in such a way that there can exist a plurality of states comprising:

i) a state wherein said drive input of said first optical transmission channel is proportional to said transmission signal, said drive input of said second optical transmission channel is proportional to said calibration signal, said second error correction circuit is measuring the response of said second optical transmission channel to said calibration signal, in order to adjust the characteristics of said second optical transmission channel to reduce its transmission errors, and said output signal is proportional to said received output of said first optical transmission channel, and;

ii) a state wherein said drive input of said second optical transmission channel is proportional to said transmission signal, the said drive input of said first optical transmission channel is proportional to said calibration signal, said first error correction circuit is measuring the response of said first optical transmission channel to said calibration signal, in order to adjust the characteristics of said first optical transmission channel to reduce its transmission errors, and said output signal is proportional to said received output of said second optical transmission channel.

6. The system defined in claim 5, wherein said output switching circuit is arranged so that said plurality of signals further comprises a signal which is the average of said received outputs of said optical transmission channels, and said plurality of states further comprises a state wherein said drive input of each of said first and second optical transmission channels is proportional to said transmission signal, and said output signal is proportional to the average of said received outputs of said optical transmission channels.

7. The system defined in claim 5 wherein said control system repetitively controls said plurality of states in a prescribed sequence.

8. The system defined in claim 6 wherein said control system repetitively controls said plurality of states in a prescribed sequence.

9. An optical transmission system for optical transmission of an electrical signal, comprising:

a) two parallel, substantially identical first and second optical transmission channels, each with means to convert an electrical drive signal applied to a drive input into optical radiation, means to convey the optical radiation to a receiver, a detector to convert the received optical radiation into an electrical detector signal, and an amplifier system to amplify the detector signal to produce a received output signal representative of said electrical drive signal;

b) a calibration generator to generate a calibration signal;

c) first and second input switching means arranged so that said drive input of each of said optical transmission channels can be proportional to either a transmission signal or said calibration signal;

d) first error correction circuit comprising means to measure the response of said first optical transmission channel to said calibration signal, in order to adjust its characteristics to reduce its transmission errors, and means to adjust its transmission characteristics; and second error correction circuit comprising means to measure the response of said second optical transmission channel to said calibration signal, in order to adjust its characteristics to reduce its transmission errors, and means to adjust its transmission characteristics;

e) output indicator means logically indicative of the operational condition of said first and second optical transmission channels; and f) a control system which controls the operation of said calibration generator, said first and second input switching means, said first and second error correction circuits, and said output indicator means in such a way that there can exist a plurality of states comprising:

i) a state wherein said drive input of said first optical transmission channel is proportional to said transmission signal, said drive input of said second optical transmission channel is proportional to said calibration signal, said second error correction circuit is measuring the response of said second optical transmission channel to said calibration signal, in order to adjust the characteristics of said second optical transmission channel to reduce its transmission errors, said received output signal of said first optical transmission channel is proportional to said transmission signal, and said output indicator means indicates that: said received output signal of said first optical transmission channel is validly representative of said transmission signal; and said received output signal of said second optical transmission channel is not validly representative of said transmission signal; and ii) a state wherein said drive input of said second optical transmission channel is proportional to said transmission signal, said drive input of said first optical transmission channel is proportional to said calibration signal, said first error correction circuit is measuring the response of said first optical transmission channel to said calibration signal, in order to adjust the characteristics of said first optical transmission channel to reduce its transmission errors, said received output signal of said second optical transmission channel is proportional to said transmission signal, said output indicator means indicates that: said received output signal of said second optical transmission channel is validly representative of said transmission signal; and said received output signal of said first optical transmission channel is not validly representative of said transmission signal.

10. The system defined in claim 9, wherein said plurality of states further comprises a state wherein said drive input of each of said first and second optical transmission channels is proportional to said transmission signal, said received output signal of each of said first and second optical transmission channels is proportional to said transmission signal, and said output indicator means indicates that said received output signal of each of said first and second optical transmission channels is validly representative of said transmission signal.

11. The system defined in claim 9 wherein said control system repetitively controls said plurality of states in a prescribed sequence.

12. The system defined in claim 10 wherein said control system repetitively controls said plurality of states in a prescribed sequence.

13. The system defined in claim 11 wherein said control system further comprises means to suspend and resume repetition of the said prescribed sequence of the said plurality of states in response to a halt control signal.

14. The system defined in claim 8 wherein said calibration generator sequentially generates said calibration signal, and a plurality of additional levels to convey additional information.

15. The system defined in claim 5 wherein said means to convey the optical radiation comprise optical fiber.

16. The system defined in claim 5 wherein said first and second optical transmission channels operate at different optical wavelengths.

17. The system defined in claim 5 wherein said transmission errors to be reduced comprise direct current (DC) offset error and gain error.

18. The system defined in claim 5 wherein said transmission errors to be reduced comprise linearity error.

19. The system defined in claim 8 wherein said transmission errors to be reduced comprise direct current (DC) offset error and gain error.

20. The system defined in claim 17 wherein said transmission errors to be reduced further comprise linearity error.

* * * * *